(12) United States Patent
Tan et al.

(10) Patent No.: US 12,347,176 B2
(45) Date of Patent: Jul. 1, 2025

(54) VERIFICATION OF EMBEDDED ARTIFICIAL NEURAL NETWORKS SYSTEMS AND METHODS

(71) Applicant: Teledyne FLIR Commercial Systems, Inc., Goleta, CA (US)

(72) Inventors: Soo Wei Tan, Richmond (CA); Di Xu, Richmond (CA); Vincent Chi Wai Siu, Richmond (CA); Timothy Yat Tien Chan, Richmond (CA); Nikita Shymberg, Richmond (CA); Ian K. Stadler, Vancouver (CA)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 461 days.

(21) Appl. No.: 17/514,199

(22) Filed: Oct. 29, 2021

(65) Prior Publication Data

US 2022/0139074 A1     May 5, 2022

Related U.S. Application Data

(60) Provisional application No. 63/114,983, filed on Nov. 17, 2020, provisional application No. 63/108,205, filed on Oct. 30, 2020.

(51) Int. Cl.
*G06V 10/82* (2022.01)
*G06N 3/063* (2023.01)
*G06N 5/04* (2023.01)

(52) U.S. Cl.
CPC ............ *G06V 10/82* (2022.01); *G06N 3/063* (2013.01); *G06N 5/04* (2013.01)

(58) Field of Classification Search
CPC ...................................................... G06V 10/82
See application file for complete search history.

(56) References Cited

U.S. PATENT DOCUMENTS

| | | | |
|---|---|---|---|
| 11,393,182 B2 * | 7/2022 | Jacquot | G06F 18/217 |
| 11,727,703 B2 * | 8/2023 | Byeon | G06F 40/12 |
| | | | 715/200 |

(Continued)

OTHER PUBLICATIONS

Tismo Technology Solutions (P) Ltd, "Machine Learning on Embedded Systems: An Exploratory Study on Gas Chromatography Analysis", 2020, pp. 1-9, Bangalore, India.

(Continued)

*Primary Examiner* — Tahmina N Ansari
(74) *Attorney, Agent, or Firm* — Haynes and Boone, LLP

(57) ABSTRACT

Various techniques are disclosed to provide for automated verification of the performance of embedded artificial neural networks (ANNs). In one example, a method includes converting a reference ANN to generate an embedded ANN for deployment on an imaging device. The method also includes deploying the reference ANN on a host. The method also includes processing predetermined images by the reference ANN on the host to generate host inference results. The method also includes receiving device inference results from the imaging device at the host in response to processing of the predetermined images by the embedded ANN on the imaging device. The method also includes comparing the device inference results with the host inference results to evaluate performance of the embedded ANN in relation to the reference ANN. Additional methods, devices, and systems are also provided.

20 Claims, 6 Drawing Sheets

(56) References Cited

U.S. PATENT DOCUMENTS

| | | | | |
|---|---|---|---|---|
| 12,183,064 | B2* | 12/2024 | Se | G06V 10/75 |
| 2018/0373980 | A1* | 12/2018 | Huval | G06F 18/41 |
| 2019/0087712 | A1* | 3/2019 | Sundaresan | G06N 3/045 |
| 2021/0149788 | A1* | 5/2021 | Downie | G06F 11/3604 |
| 2021/0150679 | A1* | 5/2021 | Roulet | G06N 3/086 |
| 2021/0182182 | A1* | 6/2021 | Felisatti | G06F 11/3688 |
| 2021/0192182 | A1* | 6/2021 | Huang | G06F 18/2413 |
| 2022/0058407 | A1* | 2/2022 | Yang | G06T 7/30 |
| 2022/0139074 | A1* | 5/2022 | Tan | G06N 5/04 |
| | | | | 382/156 |
| 2024/0330739 | A1* | 10/2024 | Lin | G06N 3/045 |

OTHER PUBLICATIONS

IDS Imaging Development Systems GmbH, IDS NXT ocean—the all-in-one solution, Jul. 27, 2020, pp. 1-4 [Retrieved: https://en-ids-imaging.com/ids-nxt-ocean.html].

Fogarty, John, "Four Keys to Machine Learning on the Edge", Nov. 12, 2019, pp. 1-8 [Retrieved: https://www.smartindustry.com/articles/four-keys-to-machine-learning-on-the-edge/].

Regan, Samantha et al., "Model Behavior. Nothing Artificial. Emerging Trends in the Validation of Machine Learning and Artificial Intelligence Models", 2017, pp. 1-20.

Xiang, Weiming et al., "Verification for Machine Learning, Autonomy, and Neural Networks Survey", Oct. 5, 2018, pp. 1-51.

Evanczuk, Stephen, "Applying Machine Learning in Embedded Systems", Jul. 11, 2018, pp. 1-24 [Retrieved: https://www.embedded.com/applying-machine-learning-in-embedded-systems/].

"How to Save Images on Basler Cameras", Jun. 3, 2016, 9 pages, Basler AG [Retrieved: https://www.baslerweb.com/en/sales-support/downloads/document-downloads/how-to-save-images-on-basler-cameras/].

Cross Check Tool—OpenVINO Toolkit. [online]. 2018 [retrieved on Nov. 3, 2020]. Retrieved from the Internet <URL: https://docs.openvino.ai/archive/2018_R5/_docs_IE_DG_Cross_Check_Tool.html>.

* cited by examiner

| Image | HostClass | HostConf | CamClass | CamConf |
|---|---|---|---|---|
| 004.jpg | 2 | 37.01% | 2 | 37.89% |
| 005.jpg | 1 | 66.83% | 1 | 64.99% |
| 006.jpg | 2 | 86.34% | 2 | 85.50% |
| 008.jpg | 2 | 85.49% | 2 | 86.03% |
| manydogs.png | 4 | 99.87% | 4 | 99.90% |
| manydogs2.png | 2 | 52.56% | 2 | 53.86% |
| meow.png | 0 | 39.27% | 0 | 40.18% |
| people3.png | 1 | 68.06% | 1 | 68.16% |
| people6.png | 1 | 91.62% | 1 | 91.41% |
| people7.png | 2 | 99.74% | 2 | 99.80% |
| spotted_rabbit... | 2 | 90.00% | 2 | 89.50% |
| _WRG2884.JPG | 2 | 97.80% | 2 | 97.90% |
| _WRG2888.JPG | 2 | 96.81% | 2 | 96.97% |
| _WRG2889.JPG | 2 | 83.48% | 2 | 82.96% |

510 — Image; 520 — HostClass; 530 — HostConf; 540 — CamClass; 550 — CamConf

Fig. 5

VERIFICATION OF EMBEDDED ARTIFICIAL NEURAL NETWORKS SYSTEMS AND METHODS

CROSS-REFERENCE TO RELATED APPLICATIONS

This application claims the benefit of U.S. Provisional Patent Application No. 63/108,205 filed Oct. 30, 2020 and entitled "VERIFICATION OF EMBEDDED ARTIFICIAL NEURAL NETWORKS SYSTEMS AND METHODS" which is hereby incorporated by reference in its entirety.

This application claims the benefit of U.S. Provisional Patent Application No. 63/114,983 filed Nov. 17, 2020 and entitled "VERIFICATION OF EMBEDDED ARTIFICIAL NEURAL NETWORKS SYSTEMS AND METHODS" which is hereby incorporated by reference in its entirety.

TECHNICAL FIELD

The present invention relates generally to artificial neural networks and, more particularly, to implementing artificial neural networks in embedded systems.

BACKGROUND

Artificial neural networks (ANNs) are often used in the field of image processing to perform object detection, classification, and/or other operations. Conventionally, ANNs are deployed on stationary host systems that have substantial computing power. However, as the capabilities of mobile devices increase, ANNs may also be deployed on such devices.

Nevertheless, deployment of ANNs on mobile devices presents unique challenges. For example, a reference ANN may be converted to an embedded format with reduced complexity for deployment on a mobile device in order to accommodate hardware limitations of the mobile device. In some cases, such conversion may introduce losses in accuracy. However, mobile devices may be operated by users with little to no experience with ANNs. As a result, the mobile device users may have limited ability to evaluate the accuracy of an embedded ANN which may be a complex and error prone process.

In addition, the mobile devices may capture and process unique images at remote locations in the field that not available to other users or systems. Consequently, it may be difficult to verify the accuracy of the processing performed by an embedded ANN deployed on a mobile device in comparison to a reference ANN deployed on stationary device with more computing power.

SUMMARY

Various techniques are disclosed to provide for improved verification of the performance of embedded ANNs in an automated fashion. In various embodiments, an embedded ANN may be generated from a reference ANN. Inference results generated by performing an inference process by the embedded ANN may be compared with inference results generated by performing another inference process by the reference ANN. In some embodiments, the embedded ANN may be deployed on an imaging device configured to capture images of a scene. Predetermined known images may be injected into the imaging device in place of the captured images to permit the embedded ANN to generate inference results using the same predetermined images as the reference ANN of a host system. As a result, the performance of the embedded ANN can be evaluated more effectively and with higher accuracy than would otherwise be available with conventional ANN deployments.

In one embodiment, a method includes converting a reference ANN to generate an embedded ANN for deployment on an imaging device; deploying the reference ANN on a host; processing predetermined images by the reference ANN on the host to generate host inference results; receiving device inference results from the imaging device at the host in response to processing of the predetermined images by the embedded ANN on the imaging device; and comparing the device inference results with the host inference results to evaluate performance of the embedded ANN in relation to the reference ANN.

In another embodiment, a method includes deploying an embedded ANN on an imaging device, wherein the embedded ANN is generated by converting a reference ANN; processing predetermined images by the embedded ANN on the imaging device to generate device inference results; and providing the device inference results from the imaging device to a host for comparison of the device inference results with host inference results generated by the reference ANN on the host to evaluate performance of the embedded ANN in relation to the reference ANN.

In additional embodiments, related devices and systems are also provided.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5 illustrates comparisons of inference results generated by a reference ANN and an embedded ANN in accordance with an embodiment of the disclosure.

Embodiments of the present invention and their advantages are best understood by referring to the detailed description that follows. It should be appreciated that like

DETAILED DESCRIPTION

In accordance with embodiments discussed herein, various systems and methods are provided to provide automated verification of the accuracy of classification and detection operations performed by ANNs that have been converted for use on imaging devices such as machine vision cameras. In some embodiments, a host may run an application (e.g., a software utility) that compares the performance and accuracy of results (e.g., inference results) provided by an embedded ANN with those provided by a reference ANN.

In some embodiments, such comparisons may be performed using one or more known (e.g., predetermined) images (e.g., user supplied images, pre-curated images, and/or randomly generated verification images) provided to both the embedded ANN and the reference ANN for performing associated inference processes to provide one or more inference results. The inference results may be reviewed and compared by users to verify that the embedded ANN is operating with desired accuracy in relation to the reference ANN.

In some embodiments, automated conversion of the reference ANN to the embedded ANN is provided, as well as automated uploading of the embedded ANN to an imaging system. In some embodiments, the embedded ANN may be implemented to accommodate color channel adaptation for color and monochrome network support for both color and monochrome imaging systems, as well as bit-depth quantization for support on constrained embedded processors. In some embodiments, a host running the reference ANN may be implemented to perform appropriate preprocessing (e.g., bilinear interpolation without anti-aliasing) to match the image processing performed by an image pipeline of the imaging system. In some embodiments, the host system may evaluate inference results provided by the reference ANN and the embedded ANN with reference thresholds for acceptable precision loss associated with the embedded ANN.

Figure 1:
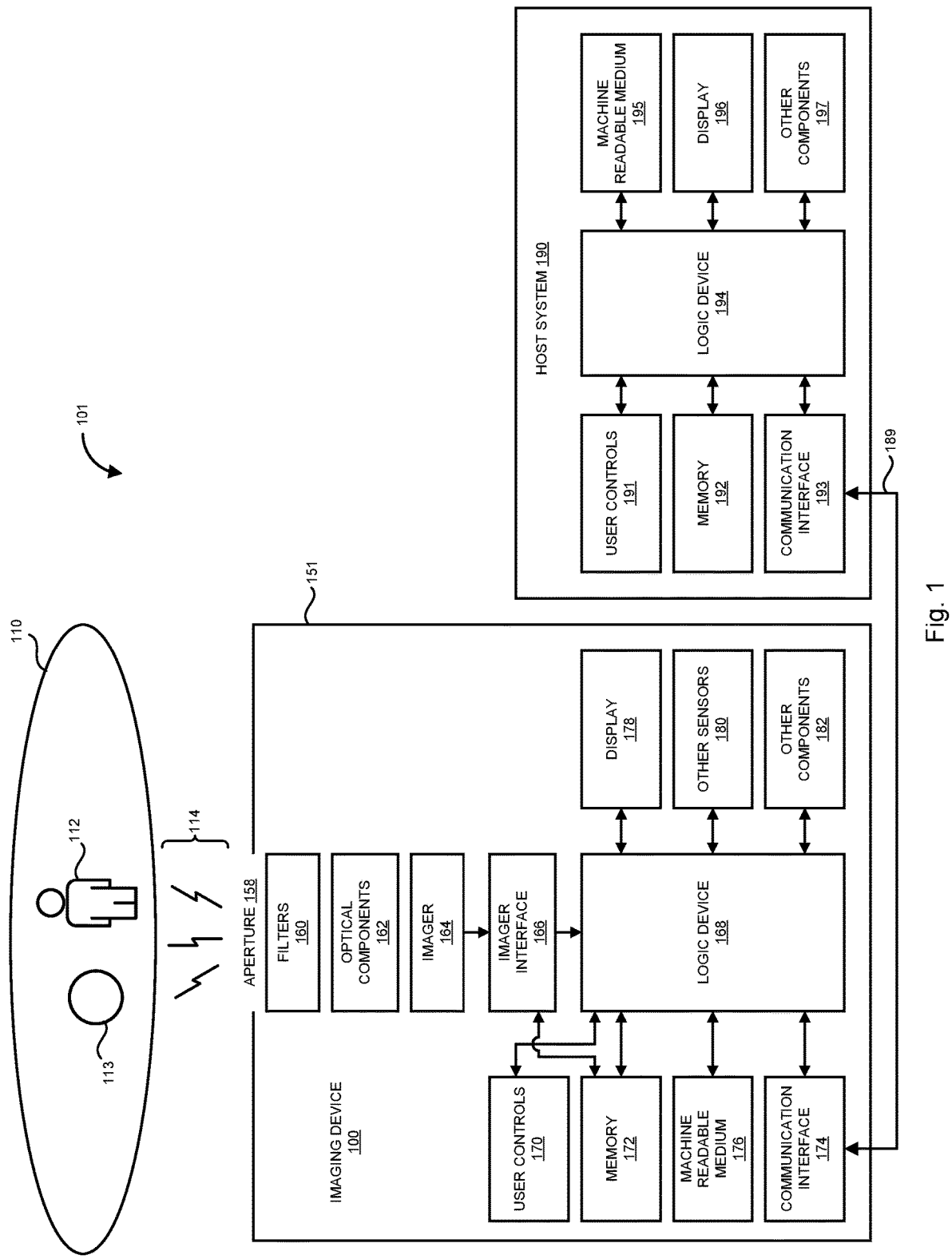
FIG. 1 illustrates a block diagram of an imaging device and a host in accordance with an embodiment of the disclosure.

Turning now to the drawings, FIG. 1 illustrates a block diagram of an imaging device 100 and a host system 190 in accordance with an embodiment of the disclosure. Imaging device 100 and host system 190 can be used together to provide a comprehensive system 101 for evaluating the performance of an embedded ANN in relation to a reference ANN.

As shown, imaging device 100 includes a housing 151 (e.g., a camera body) having an aperture 158, one or more filters 160, one or more optical components 162, an imager 164, an imager interface 166, a logic device 168, user controls 170, a memory 172, a communication interface 174, a machine readable medium 176, a display 178, other sensors 180, and other components 182.

In various embodiments, imaging device 100 may be implemented, for example, as a camera system such as a portable (e.g., handheld) camera system, a small form factor camera system implemented as part of another device, a fixed camera system, and/or other appropriate implementations. Imaging device 100 may be positioned to receive electromagnetic radiation 114 of various wavelengths from a scene 110 (e.g., a field of view of imaging device 100). In various embodiments, scene 110 may include various features of interest such as one or more persons 112, objects 113, and/or other features.

Radiation 114 is received through aperture 158 and passes through one or more filters 160 which may be provided to selectively filter particular wavelengths of interest for images to be captured by imager 164. Optical components 162 (e.g., an optical assembly including one or more lenses, additional filters, transmissive windows, and/or other optical components) pass the filtered radiation 114 for capture by imager 164.

Thus, it will be appreciated that filters 160 and/or optical components 162 may operate together to selectively filter out portions of radiation 114 such that only desired wavelengths (e.g., visible light wavelengths, infrared wavelengths, thermal wavelengths, and/or others) and/or desired radiation intensities are ultimately received by imager 164. In various embodiments, any desired combination of such components may be provided (e.g., various components may be included and/or omitted as appropriate for various implementations).

Imager 164 may capture images of scene 110 in response to radiation 114. Imager 164 may include an array of sensors for capturing images (e.g., image frames) of scene 110. In some embodiments, imager 164 may also include one or more analog-to-digital converters for converting analog signals captured by the sensors into digital data (e.g., pixel values) to provide the captured images. Imager interface 166 provides the captured images to logic device 168 which may be used to process the images, store the original and/or processed images in memory 172, and/or retrieve stored images from memory 172. In some embodiments, imager interface 166 may provide the captured images directly to memory 172 as shown.

Although a single imager 164 is illustrated, a plurality of imagers 164 and associated components may be provided in other embodiments. For example, different imagers 164 may be provided to capture the same or different wavelengths of radiation 114 simultaneously to provide associated captured images in some embodiments.

As further discussed herein, an embedded ANN may be deployed to logic device 168 which operates to process captured images and/or injected images in accordance with an associated inference process to generate results (e.g., inference results). Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging device 100 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of device 100 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging device 100 and/or separate from imaging device 100, with stored instructions provided to imaging device 100 by coupling the machine readable medium 176 to imaging device 100 and/or by imaging device 100 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of device 100. Logic device 168 may be configured to display images and information on display 178. For example, logic device 168 may be configured to retrieve images and information from memory 172 and provide images and information to display 178 for presentation to the user of device 100. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom.

In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging device 100, such as auto-focus, menu enable and selection, field of view (FoV), brightness, contrast, gain, offset, spatial, temporal, and/or various other features and/or parameters.

Imaging device 100 may include various types of other sensors 180 including, for example, microphones, navigation sensors, temperature sensors, and/or other sensors as appropriate.

Logic device 168 may be configured to receive and pass images from imager interface 166 and signals and data from sensors 180, and/or user controls 170 to host system 190 and/or other external devices (e.g., remote systems) through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging device 100 and/or its individual associated components may be associated with a particular network link such as for example a URL (Uniform Resource Locator), an IP (Internet Protocol) address, and/or a mobile phone number.

Imaging device 100 may include various other components 182 such as speakers, additional displays, visual indicators (e.g., recording indicators), vibration actuators, a battery or other power supply (e.g., rechargeable or otherwise), and/or additional components as appropriate for particular implementations.

Although various features of imaging device 100 are illustrated together in FIG. 1, any of the various illustrated components and subcomponents may be implemented in a distributed manner and used remotely from each other as appropriate (e.g., through appropriate wired and/or wireless network communication).

Host system 190 includes a logic device 194, user controls 191, a memory 192, a communication interface 193, a machine readable medium 195, a display 196, and other components 197, all of which may be implemented in the same or similar fashion as related components of imaging device 100 as discussed herein. In some embodiments, host system 190 may be implemented as a server, personal computer, and/or other appropriate device.

A reference ANN may be deployed to logic device 194 which operates to perform an associated inference process on predetermined images to generate results (e.g., inference results) that may be compared (e.g., by one or more software applications running on logic device 194) to results generated by the embedded ANN deployed on logic device 168 of imaging device 100 and/or images received therefrom.

In some embodiments, logic device 194 of host system 190 may be implemented with greater processing capabilities (e.g., capable of processing greater amounts of data in the same time) than logic device 168 of imaging device 100. As a result, a reference ANN deployed on logic device 194 of host system 190 may be larger and/or more complex than an embedded ANN deployed on logic device 168 of imaging device 100. In some embodiments, memory 192, and/or various components of host system 190 may be larger and/or more complex than associated components of imaging device 100.

As shown, imaging device 100 and host system 190 may communicate with each other over a communication connection 189 between communication interfaces 174 and 193. In this regard, although communication connection 189 is illustrated as a wired connection in FIG. 1 (e.g., Ethernet using GigEVision protocol, USB 3 using USB3Vision protocol, and/or other implementations as appropriate), wireless connections are also contemplated.

Figure 2:
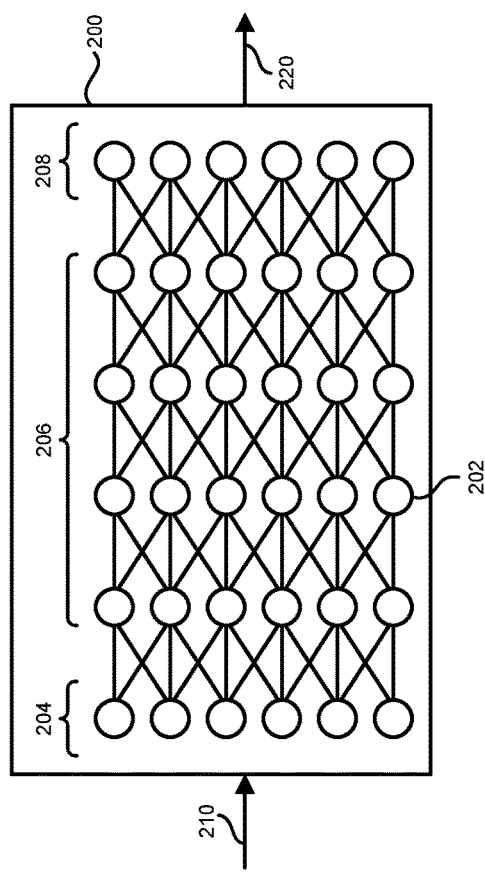
FIG. 2 illustrates a block diagram of a reference ANN deployed on a host in accordance with an embodiment of the disclosure.

FIG. 2 illustrates a block diagram of a reference ANN 200 deployed on logic device 194 of host system 190 in accordance with an embodiment of the disclosure. As shown, reference ANN 200 includes various nodes 202 (e.g., neurons) arranged in multiple layers including an input layer 204 receiving one or more inputs 210, hidden layers 206, and an output layer 208 providing one or more outputs 220. Although particular numbers of nodes 202 and layers 204, 206, and 208 are shown, any desired number of such features may be provided in various embodiments.

In some embodiments, reference ANN 200 may receive one or more images at inputs 210 for performing a reference inference process by the various nodes 202 of layers 204, 206, and 208 to generate reference inference results in response thereto. Such inference results may include, for example, detection of persons, faces, objects, industrial activities, detected motion, and/or other features or characteristics present in the received images.

The results of such detection may be provided by reference ANN 200 at outputs 220. In some embodiments, reference ANN 200 may be trained by images with known characteristics (e.g., images and related information regarding the characteristics stored in memory 192, stored in machine readable medium 195, and/or received through communication interface 193) received at inputs 210.

Figure 3:
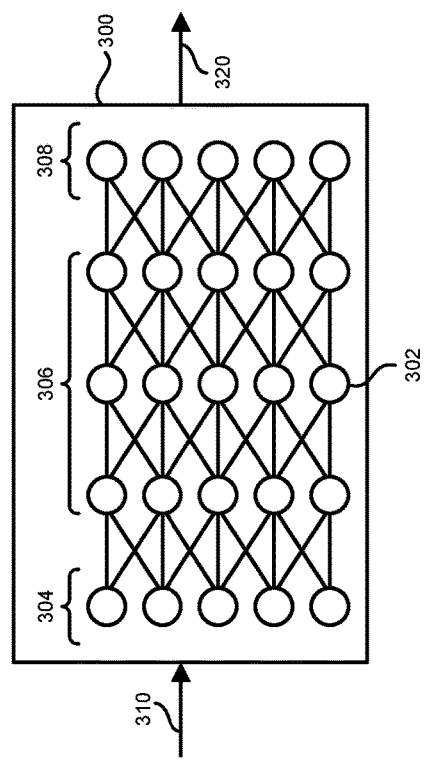
FIG. 3 illustrates a block diagram of an embedded ANN deployed on an imaging device in accordance with an embodiment of the disclosure.

FIG. 3 illustrates a block diagram of an embedded ANN 300 deployed on logic device 168 of host system 190 in accordance with an embodiment of the disclosure. In particular, embedded ANN 300 may be generated from reference ANN 200. In this regard, appropriate software (e.g., running on logic device 194 of host system 190) may convert reference ANN 200 into a format compatible with logic device 168 of imaging device 100 (e.g., Movidius, TensorFlow, Caffe, and/or other formats in some embodiments). In some embodiments, in order to accommodate the reduced processing facilities of logic device 168 in comparison with logic device 194, the converted embedded ANN 300 may exhibit a reduced number of layers and/or nodes in comparison with reference ANN 200.

For example, as shown, embedded ANN 300 includes various nodes 302 (e.g., neurons) arranged in multiple layers including an input layer 304 receiving one or more inputs 310, hidden layers 306, and an output layer 308 providing one or more outputs 320. Although particular numbers of nodes 302 and layers 304, 306, and 308 are shown, any desired number of such features may be provided in various embodiments. However, it will also be appreciated that embedded ANN 300 exhibits reduced complexity in comparison to reference ANN 200 (e.g., as exhibited by a reduced number of nodes 302 and layers 306 in comparison to nodes 202 and layers 206). In various embodiments, embedded ANN 300 may have less than or equal numbers of the various nodes 302 and layers 306 in comparison to nodes 202 and layers 206.

Embedded ANN 300 may receive one or more images at inputs 310 for performing an embedded inference process by the various nodes 202 of layers 204, 206, and 208 to generate embedded inference results in response thereto.

As discussed, reference ANN 200 may be trained. In some embodiments, such training may be performed before embedded ANN 300 is generated from reference ANN 200. As a result, embedded ANN 300 may be pre-trained when it is generated and thus may not require further training before or after it is deployed on logic device 168 of imaging device 100.

Figure 4:
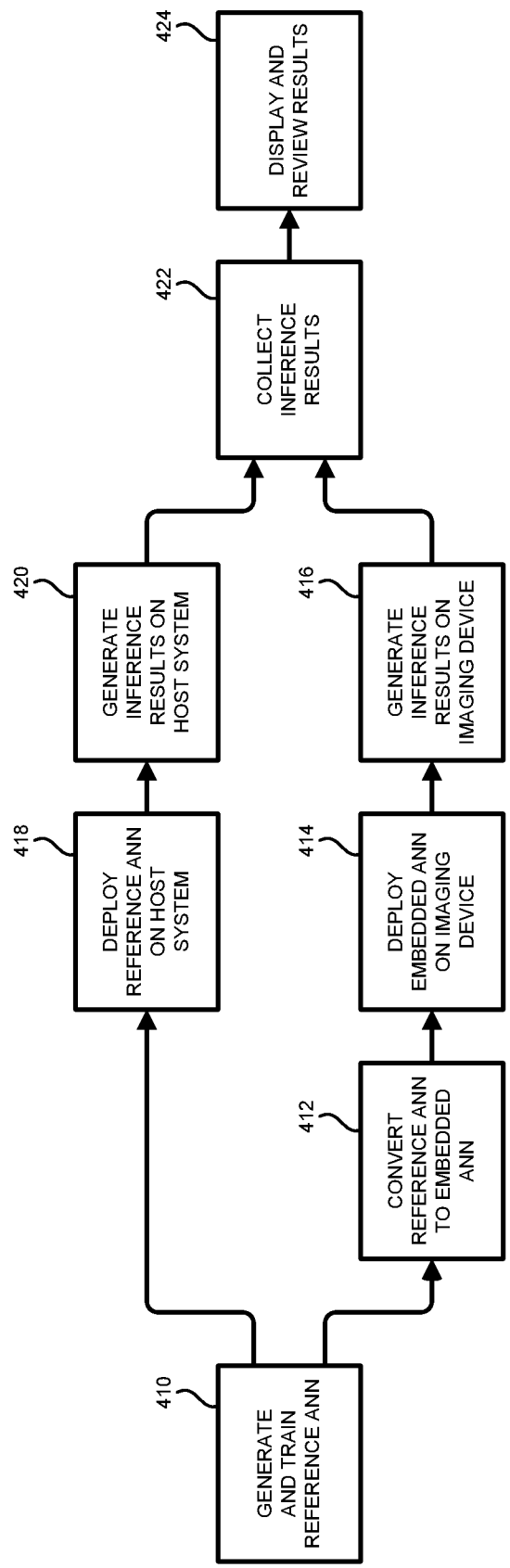
FIG. 4 illustrates a process of comparing performance of an embedded ANN deployed on an imaging device with a reference ANN deployed on a host in accordance with an embodiment of the disclosure.

FIG. 4 illustrates a process of comparing performance of embedded ANN 300 deployed on imaging device 100 with reference ANN 200 deployed on host system 190 in accordance with an embodiment of the disclosure. In block 410, logic device 194 of host system 190 generates and trains reference ANN 200. In some embodiments, this may include generating the various nodes 202 and layers 204, 206, and 208, and also training the same with known images having known characteristics as previously discussed. In some embodiments, logic device 194 may store and retrieve reference ANN 200 to and from memory 192 as appropriate.

In block 412, logic device 194 of host system 190 generates embedded ANN 300 by converting reference ANN 200 to embedded ANN 300. The original reference ANN 200 is also retained, thus permitting reference ANN 200 and embedded ANN 300 to be operated separately and simultaneously. As discussed, such conversion may be performed, for example, by appropriate software tools running on logic device 194 of host system 190. In some embodiments, logic device 194 may store and retrieve embedded ANN 300 to and from memory 192 as appropriate.

In block 414, host system 190 deploys embedded ANN 300 on logic device 168 of imaging device 100. For example, logic device 194 may transmit embedded ANN 300 from communication interface 193 to communication interface 174 over communication connection 189. Logic device 168 begins running the received embedded ANN 300 to deploy it on imaging device 100. In some embodiments, logic device 168 may store and retrieve embedded ANN 300 to and from memory 172 as appropriate. In block 416, embedded ANN 300 performs a device inference process (e.g., also referred to as an embedded inference process) on images and generates associated inference results (e.g., also referred to as device inference results and embedded inference results) therefrom.

As shown, the process of FIG. 4 further includes blocks 418 and 420 which may be performed, for example, in parallel (e.g., simultaneously) with blocks 414 and 416. In block 418, host system 190 deploys reference ANN 200 on logic device 194. For example, logic device 194 may begin running reference ANN 200 to deploy it on host system 190. In some embodiments, logic device 194 may store and retrieve reference ANN 200 to and from memory 192 as appropriate. In block 420, reference ANN 200 performs a host inference process (e.g., also referred to as a reference inference process) on images and generates associated inference results (e.g., also referred to as host inference results and reference inference results) therefrom.

Embedded ANN 300 and reference ANN 200 may process (e.g., perform inferences on) the same images in blocks 416 and 420, such as one or more reference image sets as discussed. As a result, the inference results generated in blocks 416 and 420 may be compared (e.g., by review by a user, evaluation by logic device 194, and/or other comparison techniques) to evaluate the accuracy of embedded ANN 300 in relation to reference ANN 200.

Accordingly, in block 422, host system 190 collects the inference results generated in blocks 416 and 418. For example, imaging device 100 may pass the inference results generated in block 416 over communication connection 189 to host system 190 where they are stored in memory 192. Host system 190 may store the locally generated inference results from block 420 also in memory 192. Logic device 194 may retrieve both sets of inference results in block 422.

In block 424, host system 190 provides the inference results generated in blocks 416 and 420 to a user. For example, in some embodiments, host system 190 may display the inference results on display 196. In some embodiments, block 424 may include the performing of additional processing by logic device 194 such as comparison of the inference results.

FIG. 5 illustrates comparisons of inference results generated by reference ANN 200 and embedded ANN 300 in accordance with an embodiment of the disclosure. For example, the comparison results of FIG. 5 may be provided on display 196 in block 424 of FIG. 4.

Inference results can be implemented in any appropriate format depending on the particular information intended to be detected by reference ANN 200 or embedded ANN 300. In some embodiments, an inference result may include a class value and a confidence value. The class value identifies a type of feature that has been identified by the ANN. For example, a class value of 1 may correspond to one feature type identified by an ANN (e.g., a dog) while a class value of 2 may correspond to another feature type identified by the ANN (e.g., a cat). Any desired number of classes may be identified by the ANN and may be determined in some embodiments by the images used to train the ANN.

The confidence value identifies a measure of certainty associated with the identified class. For example, a high confidence value may indicate that the ANN has identified a larger number of correlations between an image and a particular class than another image having a low confidence value for which the same class has been identified.

In FIG. 5, fourteen predetermined images (e.g., injected images) are identified in column 510 which have been processed by reference ANN 200 and embedded ANN 300 in blocks 420 and 416, respectively. For each image, a reference ANN inference result is provided by columns 520 and 530, and an embedded ANN inference result is provided by columns 540 and 550.

For example, for image 004.jpg, reference ANN 200 has identified that the image includes a feature corresponding to class 2 (column 520) with a confidence value of 37.01% (column 530). As also shown, embedded ANN 300 has also identified that image 004.jpg includes a feature corresponding to class 2 (column 540) with a confidence value of 37.89% (column 550).

Thus, by comparing the reference ANN inference result represented in columns 520/530 with the embedded ANN inference result represented in columns 540/550, it can be appreciated that reference ANN 200 and embedded ANN 300 provide similar inference results when processing the same image 004.jpg.

Upon review, it will also be appreciated that the reference ANN inference results of columns 520/530 and the embedded ANN inference results of columns 540/550 generated for the remaining images are substantially similar to each other. For example, the class values of columns 520 and 540 are identical to each other and the confidence values of columns 530 and 550 exhibit nearly equal percentages.

As a result, a user reviewing the inference results of FIG. 5 (or logic device 194 performing a comparison therebetween) may determine that reference ANN 200 and embedded ANN 300 provide substantially similar results in response to the same images. As a result, it can be determined that embedded ANN 300 operates at a high level of accuracy in comparison to reference ANN 200, despite its reduced size and complexity when deployed on logic device 168 of imaging device 100.

In contrast, if the reference ANN inference results of columns 520/530 and the embedded ANN inference results of columns 540/550 substantially differ from each other (e.g., with different class values and/or substantially different confidence values), this would indicate that embedded ANN 300 operates at a reduced level of accuracy in comparison to reference ANN 200.

Additional embodiments are also contemplated to improve the ability to test and evaluate operation of ANN 200 and other image processing features of imaging device 100 over conventional approaches. For example, in conventional imaging devices, an embedded ANN may operate only on locally captured images of test patterns or static scenes. However, such locally captured images may be impractical for evaluating the accuracy of the embedded ANN since it may be difficult or impossible to replicate the same images on other systems. Similarly, such conventional approaches may also be impractical for evaluating dynamic image processing operations performed locally at an imaging device such as automatic exposure or automatic white balance, or may prevent direct control over many variables such as lighting, color, and moving objects.

In contrast to such conventional approaches, in various embodiments, imaging device 100 may be configured to process images that are injected into imaging device 100 in place of captured images provided by imager 164. Such implementations provide significant improvements in the ability to evaluate embedded ANN 300 and other features of imaging device 100.

For example, in some embodiments, one or more images may be uploaded to imaging device 100 and transmitted to host system 190 in a video stream to permit testing of an image pipeline and embedded ANN 300 provided on imaging device 100. By uploading any desired images (e.g., arbitrary images) to imaging device 100, various features of imaging device 100 may be tested in a more complex and comprehensive manner than is available with conventional image sensor test patterns or static live scenes.

Figure 6:
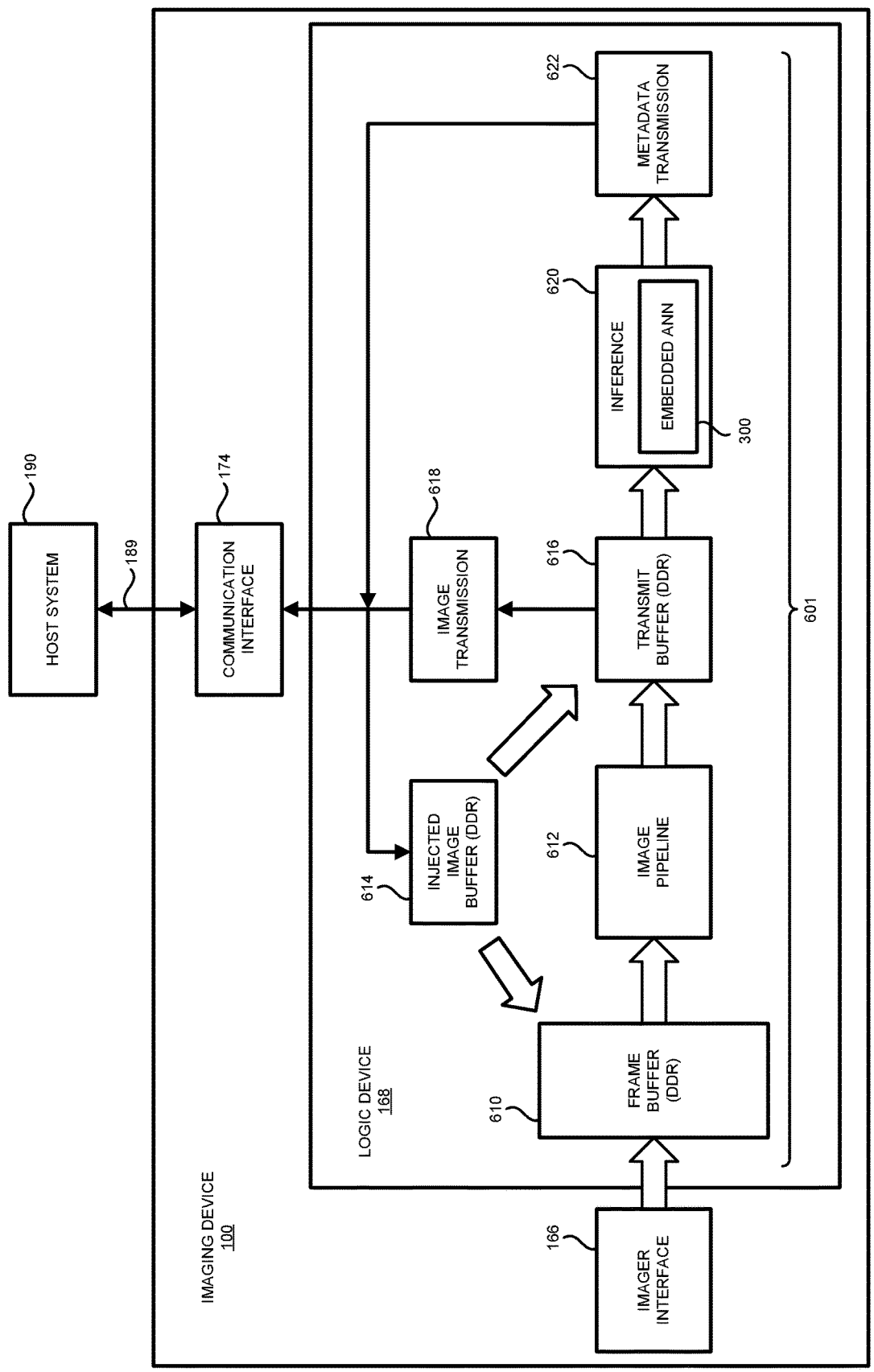
FIG. 6 illustrates a block diagram of various components used to selectively inject images into an imaging device for processing by an embedded ANN in accordance with an embodiment of the disclosure.

Accordingly, FIG. 6 illustrates a block diagram of various components used to selectively inject images into imaging device 100 for processing by embedded ANN 300 in accordance with an embodiment of the disclosure. As previously discussed, imaging device 100 is in communication with host system 190 over communication connection 189 through communication interface 174 and further includes logic device 168 and imager interface 166.

As shown, logic device 168 includes various memory buffers including a frame buffer 610, an injected image buffer 614, and a transmit buffer 616. Although buffers 610, 614, and 616 are illustrated as being implemented as part of logic device 168, this is only one example implementation provided for the reader's ease of understanding the operation of FIG. 6. In this regard, it will be understood that any or all of buffers 610, 614, and 616 may be implemented by memory 172 (e.g., as double data rate (DDR) synchronous dynamic random access memory (SDRAM) and/or otherwise) such that the relevant data associated with the buffers may be stored into and read from memory 172 by logic device 168 as appropriate.

As also shown, logic device 168 further includes an image pipeline 612, an image transmission block 618, an inference block 620, and a metadata transmission block 622. Together, frame buffer 610, image pipeline 612, injected image buffer 614, transmit buffer 616, image transmission block 618, inference block 620, and metadata transmission block 622 provide a processing path 601 of logic device 168.

During a normal mode of operating imaging device 100, images are repeatedly captured and processed by processing path 601 for further use and display as appropriate. In some embodiments, image pipeline 612 and other appropriate components of imaging device 100 may operate to support a desired frame rate of images provided by imager 164, such as approximately 30 images (e.g., image frames) per second (e.g., images may be captured and processed in approximately 33 millisecond intervals). Other image frame rates or other image capture triggering approaches (e.g., single shot, continuous trigger, multiple trigger, and/or others) may also be used as appropriate.

During the normal operation mode, images are captured by imager 164 and received by imager interface 166. Imager interface 166 passes the captured images into frame buffer 610 where they are temporarily stored. In some embodiments, the frequency that the captured image data is written to frame buffer 610 may be configured by frame rate, exposure time, and shutter time parameters associated with imager 164.

Frame buffer 610 passes the captured images through image pipeline 612 where they are processed (e.g., in accordance with various image correction or image adjustment processes such as debayering, sharpening, color correction, and/or others). The processed images are then provided to transmit buffer 616 where they are temporarily stored.

From transmit buffer 616, the images may be provided to different paths for different uses. For example, transmit buffer 616 may provide the images to image transmission block 618 where they are prepared for transmission to host system 190 through communication interface 174. As a result, captured images may undergo image processing locally at imaging device 100 and then be transmitted to a remote device such as host system 190 for further use.

In addition, transmit buffer 616 may provide the images to inference block 620 which operates embedded ANN 300. In this regard, inference block 620 processes the images by embedded ANN 300 to generate one or more inference results as discussed. These inference results can be provided as metadata to be associated with the transmitted images. Accordingly, the generated inference results are provided to metadata transmission block 622 where they are prepared for transmission to host system 190 through communication interface 174. In some embodiments, inference block 620 may process the images to generate the inference results prior to or during the transmission of the images to host system 190. In some embodiments, the images and metadata inference results may be transmitted together to provide host system 190 with the images and their associated metadata inference results (e.g., also referred to as chunk data when used in the context of the GenICam protocol).

During an evaluation mode of operating imaging device 100, predetermined images may be injected into processing path 601 for processing by image pipeline 612 and/or embedded ANN 300. In various embodiments, this alternative operation may be used to evaluate the performance of image pipeline 612 and/or embedded ANN 300.

During the evaluation mode, predetermined images may be provided from host system 190 to communication interface 174 of imaging device 100 over communication connection 189 and stored by logic device 168 in injected image buffer 614. In some embodiments, the injected images may be initially uploaded to memory 172 of imaging device 100 (e.g., using the GenICam protocol and/or others as appropriate) before being transferred to injected image buffer 614.

As shown, injected image buffer 614 may pass the injected images to frame buffer 610 or transmit buffer 616. In some embodiments, injected image buffer 614 may pass the injected images during evaluation mode at the same frame rate and/or in accordance with other triggering approaches used during normal mode as discussed.

In some embodiments, the injected images may be provided from host system 190 to imaging device 100 in realtime. In other embodiments, the injected images may be provided from host system 190 to imaging device 100 in batches to provide a sequence of images that can be repeatedly processed by image pipeline 612 and/or embedded ANN 300 to generate and evaluate object tracking performance of embedded ANN 300 in comparison to reference ANN 200.

In some embodiments, the resolution of the injected images may be limited by the maximum resolution of imager 164. In some embodiments, injected images with lower resolutions or injected images corresponding to only a desired region of interest (ROI) may be used.

When the injected images are provided to frame buffer 610, they may be provided in an appropriate data format corresponding to that provided by imager interface 166 for processing by image pipeline 612 (e.g., raw pixel data in monochrome, bayer, and/or other formats). Alternatively, when the injected images are provided to transmit buffer 616, they may be provided in a different appropriate data format corresponding to that provided by image pipeline 612 (e.g., RGB, Mono16, Mono8, YUV, and/or other formats).

Imager interface 166 may be selectively bypassed to permit frame buffer 610 to receive injected images from injected image buffer 614 instead of captured images from imager 164. In addition, image pipeline 612 may be selectively bypassed to permit transmit buffer 616 to receive injected images from injected image buffer 614 instead of processed images from image pipeline 612.

In some embodiments, logic device 168 may use direct memory access (DMA) techniques to copy the injected images from injected image buffer 614 to frame buffer 610 or transmit buffer 616 at the same rate as captured images are normally provided by imager interface 166.

As a result, logic device 168 may selectively process the injected images received from host system 190 in the same or similar manner as discussed with regard to captured images provided by imager 164. For example, by passing the injected images through image pipeline 612 and transmitting the processed images to host system 190, the performance of image pipeline 612 can be evaluated by comparing the processed images to the original injected images.

In addition, by passing the injected images through inference block 620 and transmitting the metadata inference results generated by embedded ANN 300 to host system 190, the performance of embedded ANN 300 can be evaluated effectively by comparing the inference results generated by embedded ANN 300 with inference results generated by reference ANN 200 performed on the original injected images. Advantageously, embedded ANN 300 may perform inference processing on either the original injected images received by transmit buffer 616 from injected image buffer 614 (e.g., thus bypassing image pipeline 612) or processed injected images received by transmit buffer 616 from image pipeline 612 (e.g., as a result of injected image buffer 614 providing the injected images to frame buffer 610).

The above approach provides various advantages for evaluating the performance of image pipeline 612 and embedded ANN 300. For example, by processing the injected images by image pipeline 612 prior to performing inference processing by embedded ANN 300, the effects of image processing on inference results can be evaluated.

Figure 7:
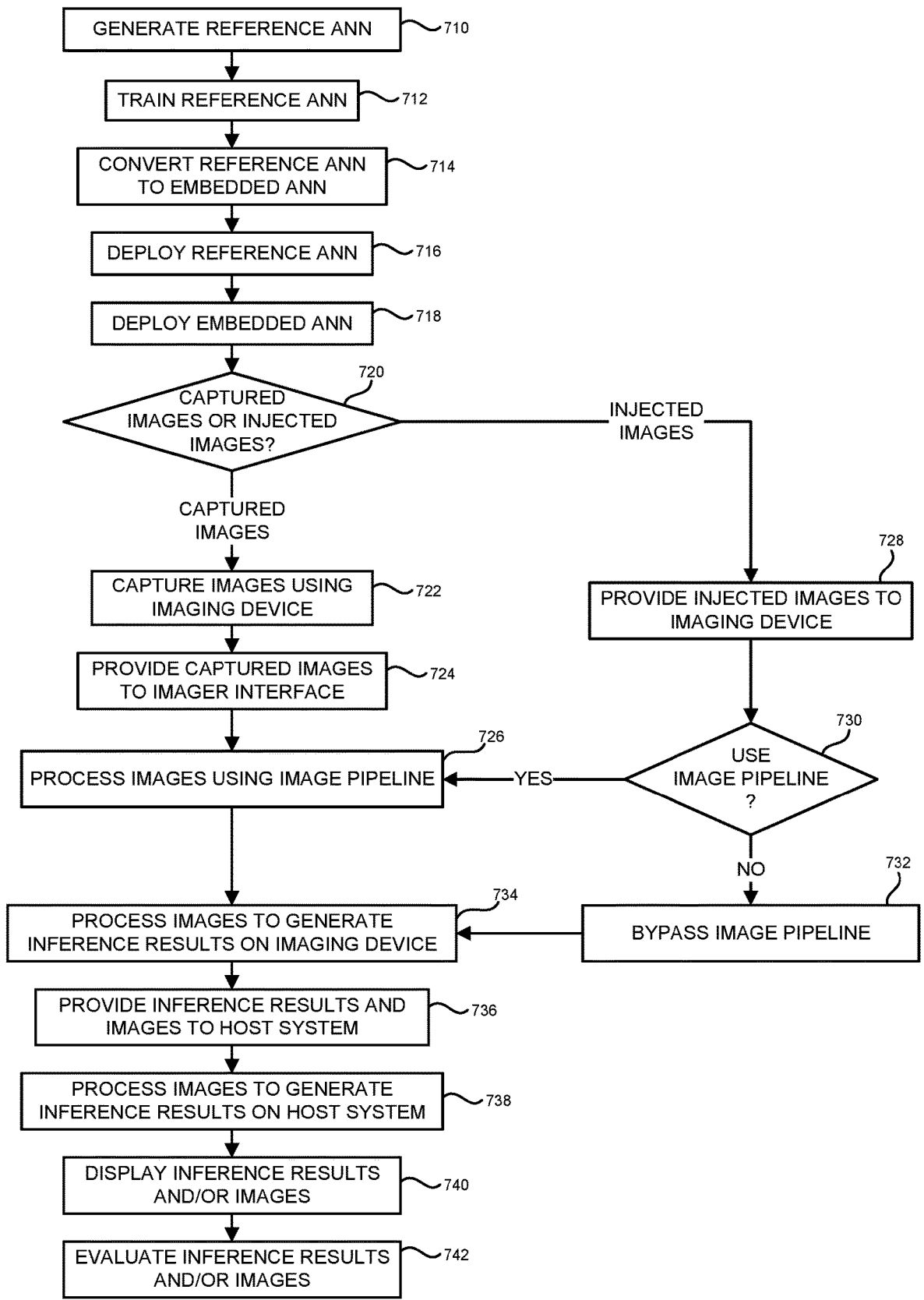
FIG. 7 illustrates a process of operating an imaging device and a host using their associated embedded and reference ANNs in accordance with an embodiment of the disclosure.

The operation of imaging device 100 and host system 190 in relation to various features noted above will now be discussed with reference to FIG. 7 which illustrates a process of operating imaging device 100 and host system 190 using their associated ANNs in accordance with an embodiment of the disclosure.

In blocks 710 and 712, logic device 194 of host system 190 generates and trains reference ANN 200 as discussed with regard to block 410 of FIG. 4. In block 714, logic device 194 of host system 190 converts reference ANN 200 to embedded ANN 300 as discussed with regard to block 412 of FIG. 4. In block 716, host system 190 deploys embedded ANN 300 on logic device 168 of imaging device 100 as discussed with regard to block 414 of FIG. 4. In block 718, host system 190 deploys reference ANN 200 on logic device 194 as discussed with regard to block 418 of FIG. 4.

In block 720, logic device 168 of imaging device 100 determines whether to operate in accordance with the normal mode (e.g., using captured images from imager 164) or the evaluation mode (e.g., using injected images from host system 190). For example, in some embodiments, such determination may be made in response to operation of user controls 170 and/or commands received from host system 190 over communication connection 189.

If normal mode is selected, then in block 722 imager 164 operates to capture images of scene 110. In block 724, imager 164 provides the captured images to imager interface 166. In block 726, imager interface provides the captured images to image pipeline 612 where they are processed and stored in transmit buffer 616 as discussed with regard to FIG. 6.

If evaluation mode is selected, then in block 728 host system 190 provides predetermined injected images to imaging device 100 where they are stored in injected image buffer 614 as discussed with regard to FIG. 6. In block 730, logic device 168 of imaging device 100 determines whether to process the injected image using image pipeline 612 (e.g., in response to operation of user controls 170 and/or commands received from host system 190 over communication connection 189).

If image pipeline 612 is to be used for the injected images, then the injected images are passed from injected image buffer 614 to frame buffer 610 and thereafter processed in block 726 in the manner of the captured images as discussed with regard to FIG. 6. If image pipeline 612 is not to be used for the injected images, then image pipeline 612 is bypassed in block 732 by passing the injected images from injected image buffer 614 to transmit buffer 616 as discussed with regard to FIG. 6.

In block 734, the injected images or the captured images (e.g., depending on the result of block 720), are processed by embedded ANN 300 to generate one or more inference results as discussed with regard to block 620 of FIG. 6. In block 736, the injected images (e.g., either processed or not processed by image pipeline 612 depending on the result of block 730) or captured images and the generated inference results are provided to host system 190 through image transmission block 618, metadata transmission block 622, and communication interface 174 as discussed with regard to FIG. 6.

In block 738, the injected images or captured images are processed by reference ANN 200 to generate one or more inference results as discussed with regard to block 420 of FIG. 6. In some embodiments, the injected images processed in block 738 may be sourced from the original injected images stored in memory 192 that were provided by host system 190 in block 728. In some embodiments, the injected images processed in block 738 may be processed versions of the injected images that have been received from imaging device 100 in block 736 after being processed by image pipeline 612. In yet other embodiments where imaging device 100 is using captured images in the normal mode of operation, block 738 may alternatively include reference ANN 200 processing the captured images to generate one or more inference results (e.g., inference results generated by embedded ANN 300 and reference ANN 200 on the same captured images may be evaluated to provide additional opportunities to evaluate the performance of embedded ANN 300 when deployed in the field).

In block 740, the inference results generated by reference ANN 200 and embedded ANN 300, the injected images, and/or the captured images are displayed on display 196 of host system 190 as discussed with regard to block 424 of FIG. 4 and the comparison results of FIG. 5.

In block 742, a user and/or logic device 194 of host system 190 evaluates the inference results and/or images displayed in block 740 to determine the accuracy of embedded ANN 300 in relation to reference ANN 200 as also discussed with regard to block 424 of FIG. 4 and the comparison results of FIG. 5.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
    converting an image processing reference artificial neural network (ANN) to generate an image processing embedded ANN for deployment on an imaging device separate from a host, wherein the embedded ANN is generated to perform the image processing of the reference ANN on the imaging device, wherein the embedded ANN exhibits reduced complexity relative to the reference ANN to accommodate hardware limitations of the imaging device relative to the host;
deploying the reference ANN on the host;
processing predetermined images by the reference ANN on the host to generate host inference results;
receiving device inference results at the host from the imaging device in response to processing of the predetermined images by the embedded ANN on the imaging device; and
comparing the device inference results with the host inference results to evaluate accuracy of the image processing performed by the embedded ANN on the imaging device in relation to the image processing performed by the reference ANN on the host.

2. The method of claim 1, further comprising providing the predetermined images from the host to the imaging device configured to inject the predetermined images into a processing path of the imaging device for processing by the embedded ANN.

3. The method of claim 1, wherein:
the imaging device is configured to selectively switch between a normal mode and an evaluation mode; and
the imaging device is configured to process locally captured images by the embedded ANN in the normal mode and process the predetermined images by the embedded ANN in the evaluation mode.

4. The method of claim 3, wherein the predetermined images have a resolution equal to or lower than the locally captured images.

5. The method of claim 3, further comprising:
receiving the locally captured images and the device inference results from the imaging device during the normal mode; and
wherein the device inference results are metadata provided with the locally captured images.

6. The method of claim 1, wherein the imaging device is configured to selectively process the predetermined images by a pipeline of the imaging device prior to the processing by the embedded ANN.

7. The method of claim 6, wherein the predetermined images are provided in a first data format while the pipeline is enabled and in a second different data format while the pipeline is bypassed.

8. The method of claim 1, further comprising:
training the reference ANN before the converting; and
wherein the embedded ANN is trained as a result of the training of the reference ANN.

9. A system configured to perform the method of claim 1, the system comprising:
a logic device configured to perform the converting, the deploying, the processing, and the comparing; and
a communication interface configured to perform the receiving.

10. A method comprising:
deploying an image processing embedded artificial neural network (ANN) on an imaging device separate from a host, wherein the embedded ANN is generated by converting an image processing reference ANN, wherein the embedded ANN is generated to perform the image processing of the reference ANN on the imaging device, wherein the embedded ANN exhibits reduced complexity relative to the reference ANN to accommodate hardware limitations of the imaging device relative to the host;
processing predetermined images by the embedded ANN on the imaging device to generate device inference results; and
providing the device inference results from the imaging device to the host for comparison of the device inference results with host inference results generated by the reference ANN on the host to evaluate accuracy of the image processing performed by the embedded ANN on the imaging device in relation to the image processing performed by the reference ANN on the host.

11. The method of claim 10, further comprising:
receiving the predetermined images from the host at the imaging device; and
injecting the predetermined images into a processing path of the imaging device for processing by the embedded ANN.

12. The method of claim 10, further comprising:
selectively switching the imaging device between a normal mode and an evaluation mode; and
wherein the imaging device is configured to process locally captured images by the embedded ANN in the normal mode and process the predetermined images by the embedded ANN in the evaluation mode.

13. The method of claim 12, wherein the predetermined images have a resolution equal to or lower than the locally captured images.

14. The method of claim 12, further comprising:
passing the locally captured images and the device inference results from the imaging device to the host during the normal mode; and
wherein the device inference results are metadata provided with the locally captured images.

15. The method of claim 10, further comprising selectively processing the predetermined images by a pipeline of the imaging device prior to the processing by the embedded ANN.

16. The method of claim 15, wherein the predetermined images are provided in a first data format while the pipeline is enabled and in a second different data format while the pipeline is bypassed.

17. The method of claim 10, wherein the reference ANN is trained before it is converted to the embedded ANN, wherein the embedded ANN is trained as a result of training the reference ANN.

18. A device configured to perform the method of claim 10, the device comprising:
an imager;
a logic device configured to perform the deploying and the processing; and
a communication interface configured to perform the providing.

19. The method of claim 1, wherein:
the embedded ANN comprises a reduced number of layers and/or nodes in comparison with the reference ANN to accommodate the hardware limitations of the imaging device.

20. The method of claim 10, wherein:
the embedded ANN comprises a reduced number of layers and/or nodes in comparison with the reference ANN to accommodate the hardware limitations of the imaging device.

* * * * *